United States Patent
Hu et al.

(10) Patent No.: US 11,239,554 B2
(45) Date of Patent: Feb. 1, 2022

(54) LIQUID CRYSTAL PHASE SHIFTING UNIT, MANUFACTURING METHOD THEREFOR, LIQUID CRYSTAL PHASE SHIFTER, AND ANTENNA

(71) Applicant: Chengdu Tianma Micro-Electronics Co., Ltd., Sichuan (CN)

(72) Inventors: Yingru Hu, Chengdu (CN); Bo Wu, Chengdu (CN); Dongquan Hou, Chengdu (CN); Xuhui Peng, Chengdu (CN)

(73) Assignee: CHENGDU TIANMA MICRO-ELECTRONICS CO., LTD., Chengdu (CN)

( * ) Notice: Subject to any disclaimer, the term of this patent is extended or adjusted under 35 U.S.C. 154(b) by 0 days.

(21) Appl. No.: 16/959,152

(22) PCT Filed: May 21, 2019

(86) PCT No.: PCT/CN2019/087731
§ 371 (c)(1),
(2) Date: Jun. 30, 2020

(87) PCT Pub. No.: WO2020/001198
PCT Pub. Date: Jan. 2, 2020

(65) Prior Publication Data
US 2020/0343635 A1 Oct. 29, 2020

(30) Foreign Application Priority Data

Jun. 27, 2018 (CN) .......................... 201810678179.4

(51) Int. Cl.
*H01Q 3/36* (2006.01)
*H01P 1/18* (2006.01)
*G02F 1/1339* (2006.01)

(52) U.S. Cl.
CPC .......... *H01Q 3/36* (2013.01); *G02F 1/13394* (2013.01); *H01P 1/184* (2013.01)

(58) Field of Classification Search
CPC .......... H03H 9/605; H03H 9/13; H03H 9/542; H03H 9/70; H01Q 3/36; G02F 1/13394; H01P 1/184
See application file for complete search history.

(56) References Cited

U.S. PATENT DOCUMENTS 5,689,314 A    11/1997  Mercer
9,219,467 B2 *  12/2015  Inoue ..................... H03H 9/725
(Continued)

FOREIGN PATENT DOCUMENTS

CN    103135287 A    6/2013
CN    105070980 A    11/2015
(Continued)

OTHER PUBLICATIONS

International Search Report in PCT/CN2019/087731.

*Primary Examiner* — Dinh T Le
(74) *Attorney, Agent, or Firm* — Kilpatrick Townsend & Stockton, LLP

(57) ABSTRACT

Provided are a liquid crystal phase shifting unit, a method for manufacturing the same, a liquid crystal phase shifter, and an antenna, which relate to the technical field of phase shifting. A liquid crystal filling region (6) is supported steadily by a support structure (4), which increases the transmission stability of a microwave signal. A space between a first substrate (1) and a second substrate (2) of the liquid crystal phase shifting unit includes the liquid crystal filling region (6). A microstrip line (3) is provided on a surface of the first substrate (1) facing towards the second substrate (2). An orthographic projection of the microstrip line (3) on the first substrate (1) is located in the liquid crystal filling region (6). The support structure (4) is pro- (Continued)

vided between the first substrate (1) and the second substrate (3) and in the liquid crystal filling region (6). The orthographic projection of the support structure (4) on the first substrate (1) does not overlap the microstrip line (3), which is used for shifting a phase of a microwave signal.

17 Claims, 8 Drawing Sheets

(56) References Cited

U.S. PATENT DOCUMENTS

2001/0017577 A1    8/2001  Toko et al.
2018/0131349 A1*   5/2018  Takata ................. H03H 9/6489

FOREIGN PATENT DOCUMENTS

| CN | 106773338 A | 5/2017 |
| CN | 107453013 A | 12/2017 |
| CN | 108803096 A | 11/2018 |

* cited by examiner

LIQUID CRYSTAL PHASE SHIFTING UNIT, MANUFACTURING METHOD THEREFOR, LIQUID CRYSTAL PHASE SHIFTER, AND ANTENNA

The present disclosure is based on International Application No. PCT/CN2019/087731, filed on May 21, 2019, which claims the priority of Chinese Patent Application No. 201810678179.4, entitled "LIQUID CRYSTAL PHASE SHIFTING UNIT, MANUFACTURING METHOD THEREFOR, LIQUID CRYSTAL PHASE SHIFTER, AND ANTENNA", and filed on Jun. 27, 2018, the content of which are incorporated herein by reference in its entirety.

FIELD

The present disclosure relates to the field of phase shifting, and more particularly, to a liquid crystal phase shift unit, a manufacturing method therefor, a liquid crystal phase shifter, and an antenna.

BACKGROUND

A phase shifter is a device capable of adjusting a phase of a wave, and is widely used in various fields, such as radar, accelerator, communications, instrumentation, and even music field. The current widely used phase shifter is the liquid crystal phase shifter.

The liquid crystal phase shifter includes multiple liquid crystal phase shifting units. FIG. 1 is a schematic diagram of an existing liquid crystal phase shifting unit. As shown in FIG. 1, the liquid crystal phase shifting unit includes a first rigid substrate 1', and a second rigid substrate 2' and a third rigid substrate 3' which are disposed opposite to each other. The first rigid substrate 1' is provided with a microstrip line groove 4' for disposing a microstrip line, and the second rigid substrate 2' is provided with a liquid crystal groove 5' for disposing liquid crystal molecules, and the third rigid substrate 3' is provided with a feed line.

The existing liquid crystal phase shifting unit has a relatively large cell gap, which may be hundreds of micrometers. Based on the structure of the existing liquid crystal phase shifting unit, on the one hand, the process errors is inevitable when providing the liquid crystal groove 5' on the second rigid substrate 2', leading to an uneven thickness of liquid crystal groove 5' and further leading to a poor uniformity of the cell gap, which makes filling volume of liquid crystal molecules fluctuate greatly; on the other hand, such structure cannot effectively support the region corresponding to the liquid crystal groove 5', further leading to uneven cell gap.

SUMMARY

In view of the above, embodiments of the present disclosure provide a liquid crystal phase shifting unit, a manufacturing method therefor, a liquid crystal phase shifter, and an antenna, in each of which a liquid crystal filling region is steadily supported by a support structure, improving a uniformity of a cell gap and improving a transmission stability of a microwave signal.

One embodiment of the present disclosure provides a liquid crystal phase shifting unit. The liquid crystal phase shifting unit includes a first substrate and a second substrate disposed opposite each other, a microstrip line provided on a surface of the first substrate facing towards the second substrate, a support structure provided between the first substrate and the second substrate, and liquid crystal molecules. A space between the first substrate and the second substrate includes a liquid crystal filling region. An orthographic projection of the microstrip line on the first substrate is located in the liquid crystal filling region. The support structure is located in the liquid crystal filling region, and an orthographic projection of the support structure on the first substrate does not overlap the microstrip line. The liquid crystal filling region is filled with the liquid crystal molecules.

One embodiment of the present disclosure provides a manufacturing method for a liquid crystal phase shifting unit. The manufacturing method for a liquid crystal phase shifting unit is applied to the above liquid crystal phase shifting unit and includes:

forming the microstrip line on the first substrate in such a manner that the orthographic projection of the microstrip line on the first substrate being is provided in the liquid crystal filling region forming the support structure on the first substrate, and the support structure is located in the liquid crystal filling region, and the orthographic projection of the support structure on the first substrate does not overlap the microstrip line;

providing the second substrate at a side of the support structure facing away from the first substrate; and filling the liquid crystal filling region with the liquid crystal molecules.

One embodiment of the present disclosure provides a liquid crystal phase shifter, and the liquid crystal phase shifter includes multiple above liquid crystal phase shifting units that are arranged in an array.

One embodiment of the present disclosure provides an antenna, and the antenna includes the above liquid crystal phase shifter.

In an embodiment of the present disclosure, liquid crystal filling region located between the first substrate and the second substrate is filled with the liquid crystal molecules, and the support structure is provided in the liquid crystal filling region, multiple areas in the liquid crystal filling region can be steadily supported by the support structure, the variance of the cell gap at different regions of the liquid crystal filling region is reduced and the uniformity of the cell gap of the liquid crystal filling region is improved, that is, the uniformity of the thickness of the liquid crystal layer where the liquid crystal molecules are located is improved. Further, with such arrangement, it only needs to fill the liquid crystal molecules between the first substrate and the second substrate and there is no need to arrange a liquid crystal groove on the substrate, thus avoiding the uneven thickness of the liquid crystal groove caused by process. Furthermore, the orthographic projection of the support structure on the first substrate does not overlap with the microstrip line, it can avoid the contact between the support structure and the microstrip line. When a microwave signal is transmitted on the microstrip line, it can be avoided that the support structure affects the transmission of the microwave signal.

The embodiments of the present disclosure can not only steadily support the liquid crystal filling region to improve the uniformity of the cell gap, but also avoid the affecting of the support structure on the transmission of the microwave signal, thus improving the transmission stability of the microwave signal.

BRIEF DESCRIPTION OF DRAWINGS

Embodiments of the present disclosure as shown in the accompanying drawings. Apparently, the drawings described as follows are merely part of the embodiments of the present disclosure.

DESCRIPTION OF EMBODIMENTS

The embodiments of the present disclosure are described in detail below with reference to the accompanying drawings.

The terms used in the embodiments of the present disclosure are merely for the purpose of describing particular embodiments, but not intended to limit the present disclosure. Unless otherwise noted in the context, the singular form expressions "a", "an", "said" and "the" used in the embodiments and appended claims of the present disclosure are also intended to represent plural form expressions.

It should be understood that, the term "and/or" as used herein merely means an association relationship that describes relation of associated objects, which means that there may be three relationships. For example, "A and/or B" may represent three cases: only "A", "A and B", and only "B". In addition, the symbol "/" as used herein generally means an "or" relation of the associated objects.

It should be understood that, although the support bars may be described using the terms of "first", "second", "third", etc., in the embodiments of the present disclosure, the support bars will not be limited to these terms. These terms are merely used to distinguish support bars from one another. For example, without departing from the scope of the embodiments of the present disclosure, a first support bar may also be referred to as a second support bar, similarly, a second support bar may also be referred to as a first support bar.

Figure 1:
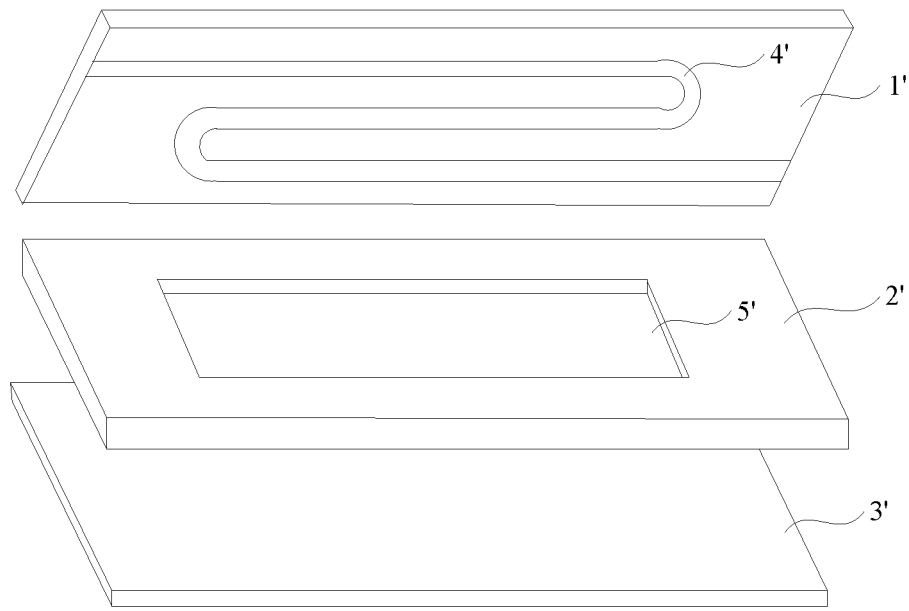
FIG. 1 is a schematic diagram of a liquid crystal phase shifting unit in the prior art.
Figure 2:
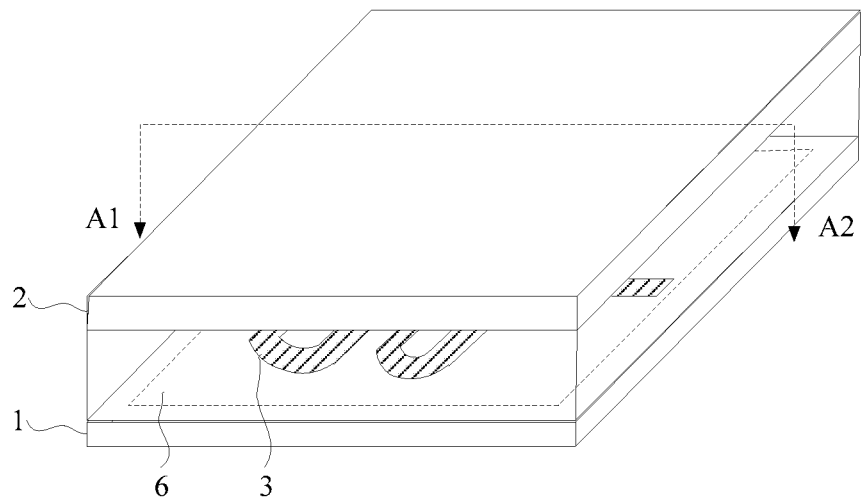
FIG. 2 is a top view of a liquid crystal phase shifting unit provided by an embodiment of the present disclosure.
Figure 3:
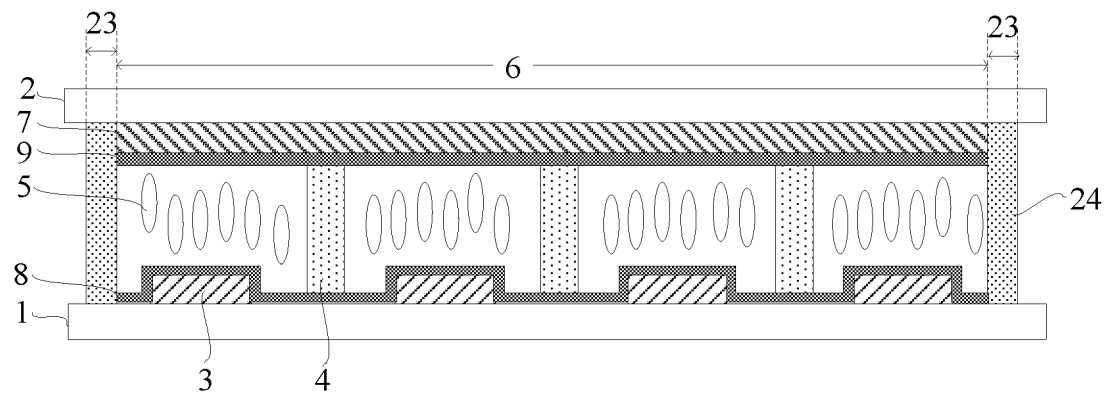
FIG. 3 is a sectional view taken along a direction A1-A2 shown in FIG. 2.

An embodiment of the present disclosure provides a liquid crystal phase shifting unit. FIG. 2 is a top view of a liquid crystal phase shifting unit provided by an embodiment of the present disclosure. FIG. 3 is a sectional view taken along a direction A1-A2 shown in FIG. 2. As shown in FIG. 2 and FIG. 3, the liquid crystal phase shifting unit includes a first substrate 1 and a second substrate 2 that are disposed opposite to each other, a microstrip line 3, a support structure 4 and liquid crystal molecules 5.

A space between the first substrate 1 and the second substrate 2 includes a liquid crystal filling region 6. The microstrip line 3 is provided on a surface of the first substrate 1 facing towards the second substrate 2, and an orthographic projection of the microstrip line 3 on the first substrate 1 is located in the liquid crystal filling region 6. The support structure 4 is provided between the first substrate 1 and the second substrate 2 and is located in the liquid crystal filling region 6, and an orthographic projection of the support structure 4 on the first substrate 1 does not overlap the microstrip line 3. The liquid crystal filling region 6 are filled with the liquid crystal molecules 5.

In addition, it should be understood that, in order to shift the phase of the microwave signal through the liquid crystal molecules 5, the liquid crystal phase shifting unit further includes a grounded layer 7 provided on a surface of the second substrate 2 facing towards the first substrate 1, a first alignment layer 8 provided at a side of the microstrip line 3 facing towards the second substrate 2, and a second alignment layer 9 provided at the grounded layer 7 facing towards the first substrate 1.

When the liquid crystal phase shifting unit is not in operation, there is no voltage on the microstrip line 3 and the grounded layer 7, the liquid crystal molecules 5 are orientated in a preset direction under the action of the first alignment layer 8 and the second alignment layer 9. When the liquid crystal phase shifting unit is operating, certain voltage signals are supplied to the microstrip line 3 and the grounded layer 7 respectively, an electric field is formed between the microstrip line 3 and the grounded layer 7, and the liquid crystal molecules 5 are driven to be deflected by the electric field. At the same time, a microwave signal is transmitted in the microstrip line 3. In the transmission process of the microwave signal, its phase is changed due to the deflection of the liquid crystal molecules 5, and the phase of the microwave signal is shifted. By controlling the voltages on the microstrip line 3 and the grounded layer 7, the deflection angles of the liquid crystal molecules 5 can be controlled, and thus the phases adjusted in the phase shifting process can be controlled.

With the liquid crystal phase shifting unit provided by embodiments of the present disclosure, the liquid crystal filling region 6 arranged between the first substrate 1 and the second substrate 2 are filled with the liquid crystal molecules 5, and the support structure 4 is provided in the liquid crystal filling region 6, multiple regions in the liquid crystal filling region 6 can be steadily supported by the support structure 4, and the variance of cell gap at different areas of the liquid crystal filling region 6 is reduced and the uniformity of the cell thickness of the liquid crystal filling region 6 is improved, that is, the uniformity of the thickness of the liquid crystal layer where the liquid crystal molecules 5 are located is improved. Further, with such arrangement, it only needs to fill the liquid crystal molecules 5 between the first substrate 1 and the second substrate 2 and there is no need to arrange a liquid crystal groove on the substrate, thus avoiding the uneven thickness of the liquid crystal groove caused by the process. Furthermore, the orthographic projection of the support structure 4 on the first substrate 1 does not overlap the microstrip line 3, which can avoid the contact between the support structure 4 and the microstrip line 3. When a microwave signal is transmitted on the microstrip line 3, it can be avoided that the support structure 4 affects transmission of the microwave signal transmitted on the microstrip line 3.

It can be seen that the liquid crystal phase shifting unit provided by the embodiments of the present disclosure can not only steadily support the liquid crystal filling region 6, which improves the uniformity of the cell gap, but also avoid the support structure 4 of affecting the transmission of the microwave signal, thus improving the transmission stability of the microwave signal.

In addition, in embodiments of the present disclosure, based on the filling manner of the liquid crystal molecules 5, since there is no need to set the liquid crystal groove on the substrate, the second rigid substrate in the existing art can be omitted, which not only reduces the cost and manufacturing difficulty but also reduces the number of making substrates be in alignment and improves the accuracy of keeping substrates in alignment.

In addition, in the existing art, the spacers are generally sprayed on a surface of the substrate in a spray manner to achieve the supporting for the large cell thickness. However, since it is unable to control the spray region in the spray process, some of the spacers will be sprayed to the area where the microstrip line 3 is located. Accordingly, when the microwave signal is transmitted in the microstrip line 3, the microwave signal passes through the spacers, the spacers produce interference or diffraction to the microwave signal, which affects the transmission of the microwave signal.

Figure 4:
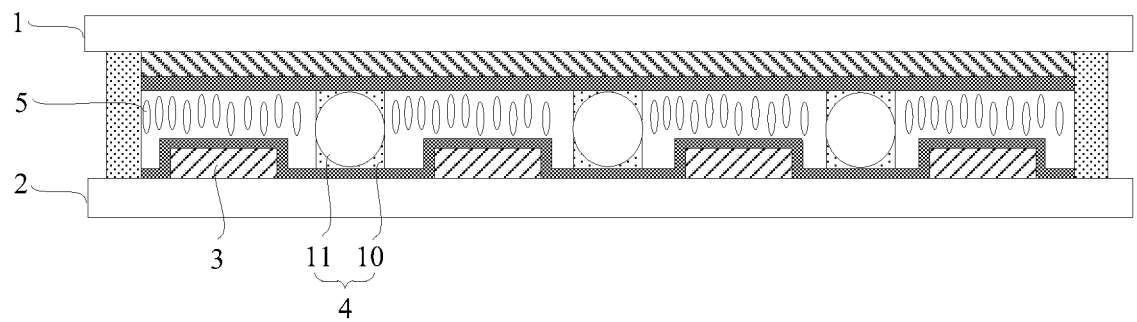
FIG. 4 is a side view of a support structure provided by an embodiment of the present disclosure.
Figure 5:
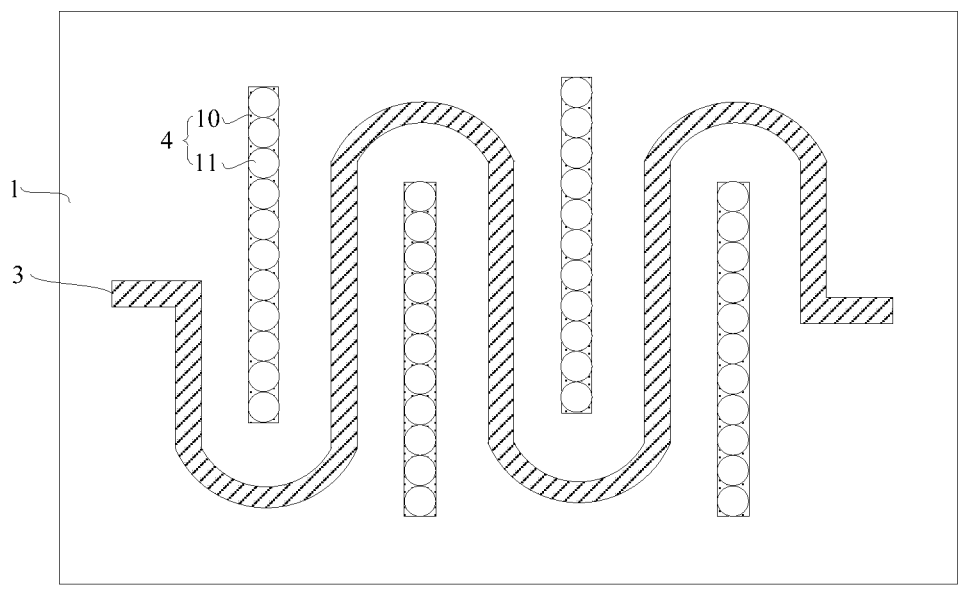
FIG. 5 is a top view of the support structure provided by an embodiment of the present disclosure.

In view of the above, in embodiments of the present disclosure, FIG. 4 is a side view of a support structure provided by an embodiment of the present disclosure, FIG. 5 is a top view of the support structure provided by an embodiment of the present disclosure, as shown in FIG. 4 and FIG. 5, the support structure 4 includes a sealant 10 and spacers 11 distributed in the sealant 10. In the manufacturing process of this support structure 4, the spacers 11 are firstly mixed in the sealant 10, and then the sealant 10 mixed with the spacers 11 is coated on the first substrate 1. Compared with the spray manner to form the spacers 11, using the structure and arranging manner in embodiments of the present disclosure, the positions of the spacers 11 are fixed by means of the sealant 10, and the spacers 11 are prevented from getting into contact with the microstrip line 3, avoiding the interference or diffraction of the microwave signal caused by the spacers 11, improving the transmission stability of the microwave signal, and further improving the accuracy of the phase shifting. Further, referring to FIG. 4 again, since the sealant 10 is made of soft material, an upper surface of the sealant 10 will be in alignment with an upper surface of the spacers 11 during the coating process, and thus the height of the support structure 4 is defined by the height of the spacers 11. Since the spacers 11 have a same size, i.e., a same diameter, it can be ensured that the support structure 4 has a same height at different positions in the sealant 10 after the coating process, which further improves the uniformity of the thickness of the liquid crystal layer where the liquid crystal molecules 5 are located.

It should be noted that the strict instrument selection can ensure that the spacers have the same diameter, and these spacers having the same diameter are added to the sealant for mixing. Therefore, using the sealant with spacers distributed inside as the support structure can ensure the height uniformity. However, if the support structure is formed in other manners, for example, formed by patterning an organic material, due to the process errors, the height of the formed supporting structure will inevitably not be completely the same. In addition, the height of the support structure in the liquid crystal phase shifting unit is larger than the height of the support structure included in the conventional liquid crystal display, and the support structure cannot be formed by patterning the organic material with the existing manufacturing process.

Furthermore, the spacers in embodiments of the present disclosure can be organic resin cushion balls. The organic resin cushion balls are elastic. Therefore, even if it cannot be guaranteed that all organic resin cushion balls have a same height in the direction perpendicular to the liquid crystal phase shifting unit, the organic resin cushion ball has a larger height will be compressed, when being pressed, to a height same as other organic resin cushion balls due to the elasticity of the organic resin cushion ball.

In one embodiment, please refer to FIG. 5 again, in order to increase an area of the microstrip line 3 opposite to the grounded layer 7 for ensuring that as many liquid crystal molecules 5 as possible are kept in the electric field formed by the microstrip line 3 and the ground layer 7 and increasing the deflecting efficiency of the liquid crystal molecules 5, the microstrip line 3 is a serpentine wire.

Figure 6:
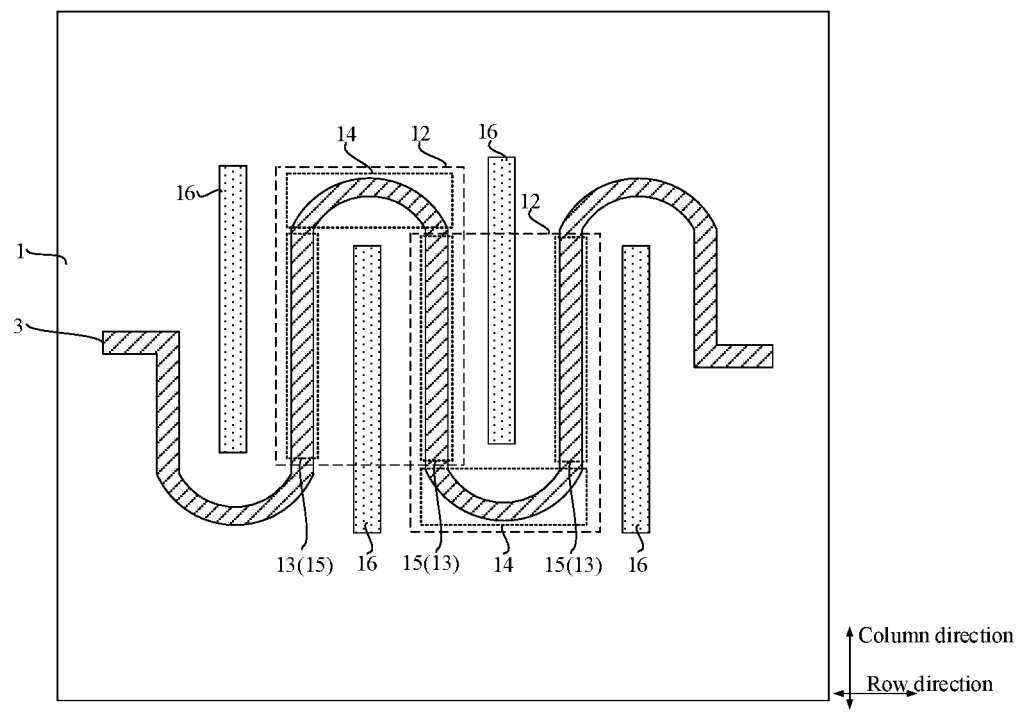
FIG. 6 is a schematic diagram of the support structure provided by an embodiment of the present disclosure.

Furthermore, as shown in FIG. 6, which is a schematic diagram of the support structure provided by an embodiment of the present disclosure, the microstrip line 3 includes multiple U-shaped structures 12. For any two adjacent U-shaped structures 12, their U-shaped openings have opposite orientations. Each U-shaped structure 12 includes a first transmission wire segment 13, a second transmission wire segment 14 and a third transmission wire segment 15 that are connected in sequence. For any two adjacent U-shaped structures 12, the third transmission wire segment 15 of one U-shaped structure 12 is reused as the first transmission wire segment 13 of the other U-shaped structure 12. The support structure 4 includes multiple first support bars 16, and the multiple first support bars 16 are located in the U-shaped openings of the U-shaped structures 12. The first support bars 16 extend in a column direction.

With the first support bar being arranged in the U-shaped opening, on the premise of avoiding the contact between the first support bar 16 and the microstrip line 3, the peripheral area of the microstrip line 3 in the liquid crystal filling region 6 can be steadily supported, thus improving the uniformity of the cell thickness in the peripheral area of the microstrip line 3 and improving the accuracy of the phase shifting of the microwave signal caused by the liquid crystal molecules 5.

Figure 7:
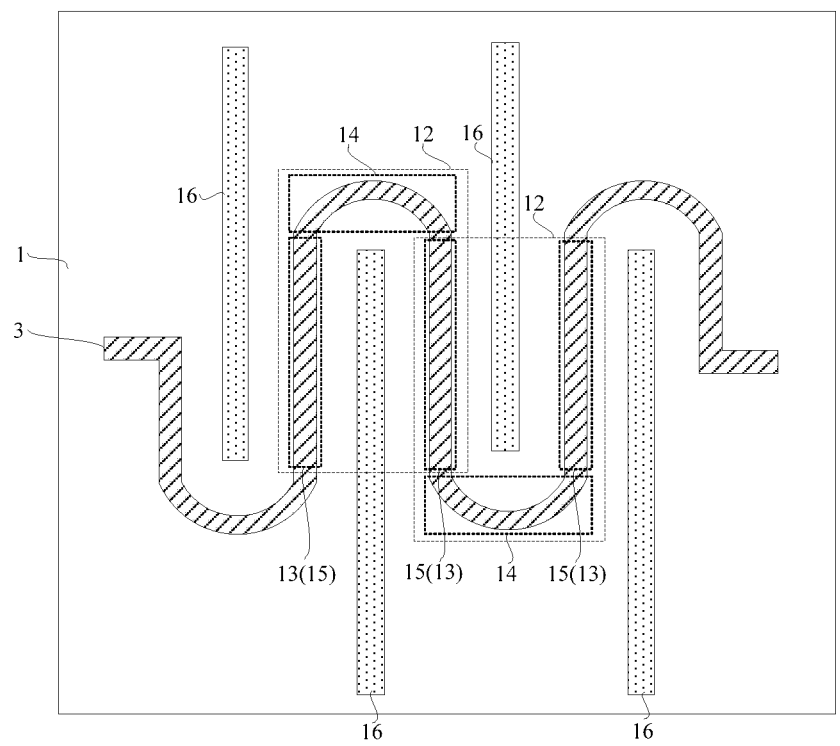
FIG. 7 is another schematic diagram of a support structure provided by an embodiment of the present disclosure.

As shown in FIG. 7, which is another schematic diagram of the support structure provided by an embodiment of the present disclosure, at least part of the first support bars 16 extends out of the U-shaped opening. With such arrangement, the length of the first support bar 16 can be increased, the first support bar 16 not only can steadily support the peripheral regions of the microstrip line 3, but also can support other regions of the liquid crystal filling region 6, which improves the overall uniformity of the cell gap of the liquid crystal filling region 6.

Figure 8:
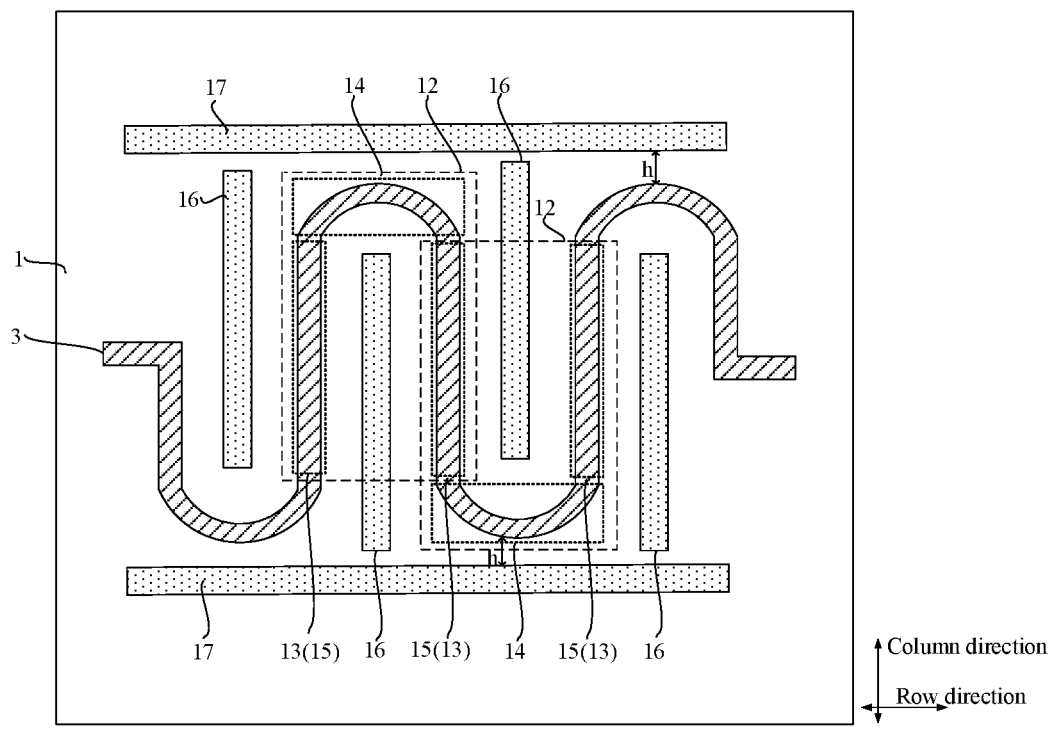
FIG. 8 is yet another schematic diagram of a support structure provided by an embodiment of the present disclosure.
Figure 9:
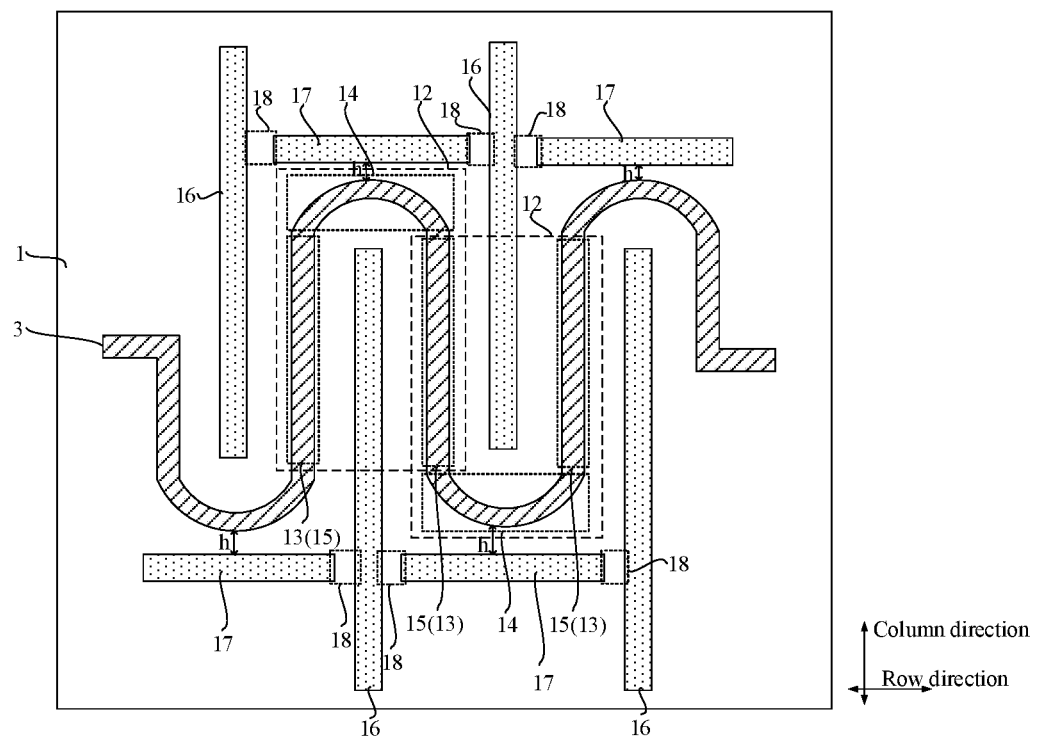
FIG. 9 is still another schematic diagram of a support structure provided by an embodiment of the present disclosure.

FIG. 8 is yet another schematic diagram of the support structure provided by an embodiment of the present disclosure. FIG. 9 is still another schematic diagram of the support structure provided by an embodiment of the present disclosure. Furthermore, as shown in FIG. 8 and FIG. 9, the sealant 10 further includes multiple second support bars 17 located at a side of the second transmission wire segment 14 facing away from the corresponding U-shaped opening. In addition, the second support bar 17 extends in a row direction, and a minimum distance between an orthographic projection of the second support bar 17 on the first substrate 1 and the second transmission wire segment 14 is h, where 3 mm≤h≤8 mm. By additionally providing the second support bar 17 and arranging the second support bar 17 on the periphery of the second transmission wire segment 14, the peripheral region of the microstrip line 3 can be steadily supported, and the uniformity of the cell gap at this area is further increased.

It should be noted that, in practical applications, the length of the second support bar 17 can be adaptively set according to the length of the first support bar 16. Exemplarily, please refer to FIG. 8 again, when the entire first support bar 16 is provided only in the U-shaped openings, the second support bars 17 can be longer; alternatively, please refer to FIG. 9 again, when a part of the first support bar 16 extends out of the U-shaped openings, the second support bar 17 can be shorter.

In one embodiment, please refer to FIG. 9 again, there is a space 18 between the first support bar 16 and the second support bar 17. With the space 18 provided between the first support bar 16 and the second support bar 17, on the one hand, after the first substrate 1 and the second substrate 2 are oppositely arranged to form a cell, the air flow can be ensured to be smooth, which can prevent the support bar from being impacted by the liquid crystal molecules 5 when filling with the liquid crystal molecules 5, which can avoid such impact causes the support bar to be punctured; on the other hand, during the filling of the liquid crystal molecules 5, the liquid crystal molecules 5 can pass multiple spaces 18 and then effectively and quickly fill the entire liquid crystal filling region 6, which improves the filling efficiency of the liquid crystal molecules 5.

Figure 10:
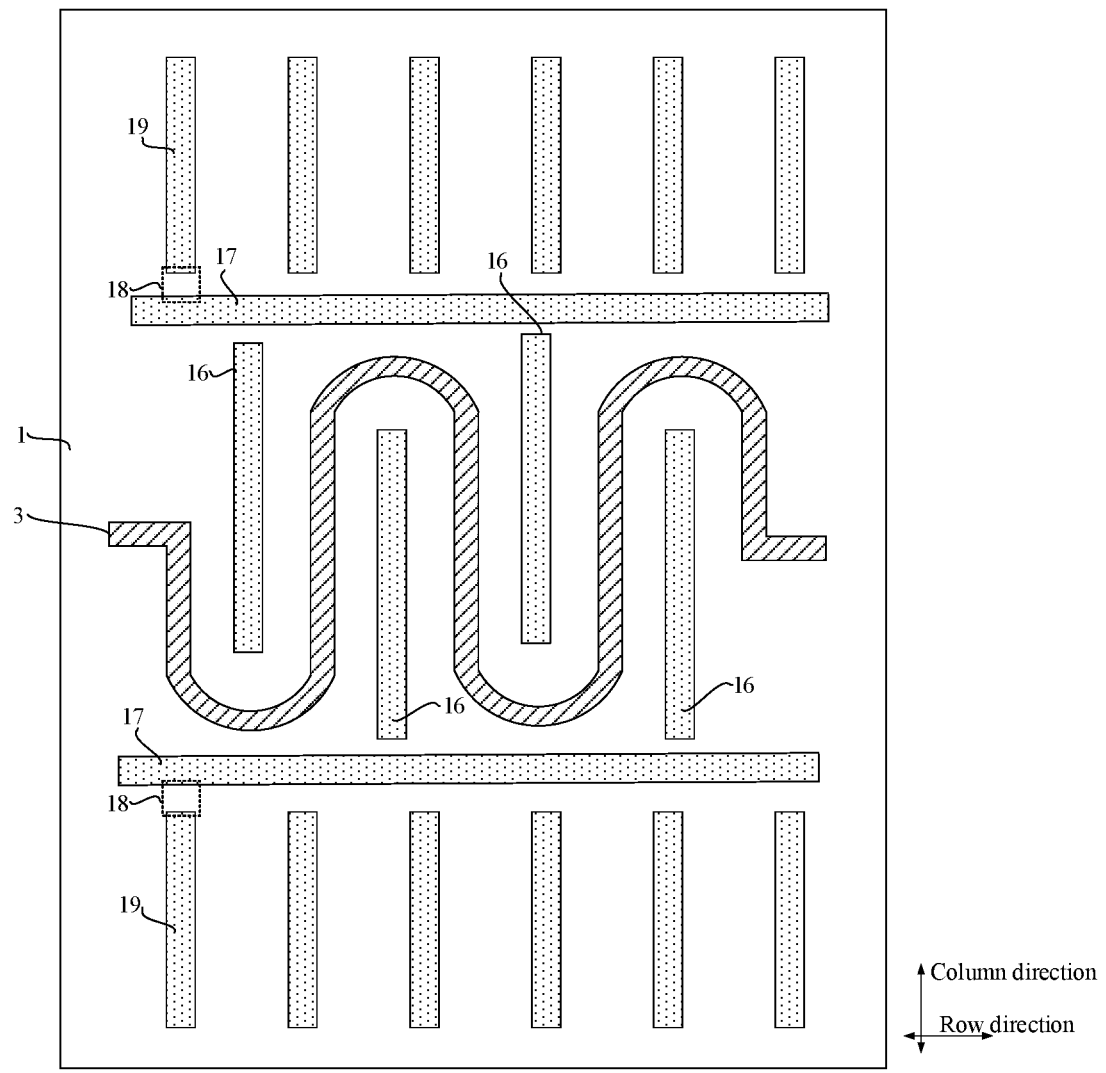
FIG. 10 is another schematic diagram of the support structure provided by an embodiment of the present disclosure.

In addition, in order to further improve the uniformity of the cell gap of the entire liquid crystal filling region 6 and improve the accuracy of the phase shifting of the microwave signal caused by the liquid crystal molecules 5, as shown in FIG. 10, which is another schematic diagram of the support structure provided by an embodiment of the present disclosure, the sealant 10 can further include multiple third support bars 19 arranged at a side of the second support bar facing away from the microstrip line and extend in the column direction.

Moreover, please refer to FIG. 10 again, in order to avoid the puncture of the support bar and ensure the efficient filling of liquid crystal molecules 5, the gap 18 can be provided between the second support bar 17 and the third support bar 19.

Figure 11:
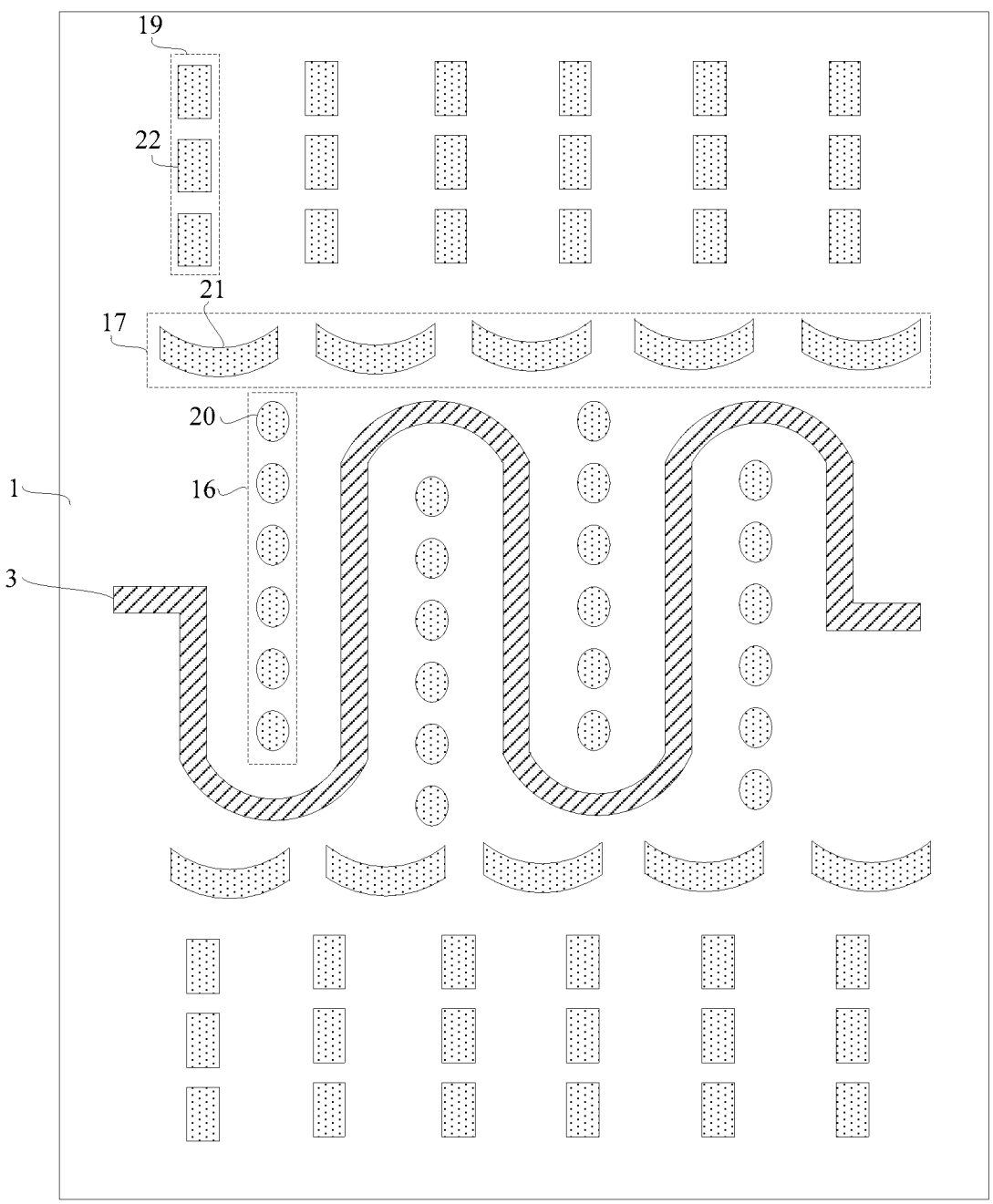
FIG. 11 is yet another schematic diagram of the support structure provided by an embodiment of the present disclosure.

FIG. 11 is yet another schematic diagram of the support structure provided by an embodiment of the present disclosure. As shown in FIG. 11, each first support bar includes multiple discontinuous first support segments 20; and/or each second support bar includes multiple discontinuous second support segments 21; and/or each third support bar includes multiple discontinuous third support segments 22.

Taking the first support bar 16 as an example, no matter whether the first support bar 16 is a continuous bar structure or a structure including multiple discontinuous segments, the liquid crystal filling region 6 can be steadily supported and the uniformity of the cell gap at this region is improved. However, when the first support bar 16 is the structure including multiple discontinuous segments, the position where the first support segment 20 is located can be set according to the external force applied to the liquid crystal phase shifting unit. For example, the first support segment 20 can be disposed in a region of the liquid crystal phase shifting unit where the external force is large, so that when a large external pressure is applied to this region, this region is supported by the first support segment 20, which can reduce the deformation of this region, reducing difference between the cell gap at this region and the cell gap at other regions. The second support bar 17 and the third support bar 19 can be configured likewise, and will not be repeated herein.

It should be noted that, the shape of the support segment can be a sphere or an ellipsoid as the first support segment 20 shown in FIG. 11, or can be a curved bar as the second support segment 21 shown in FIG. 11, or can be a cuboid as the third support segment 22 shown in FIG. 11. Of course, in other optional embodiments of the present disclosure, the shape of the support segment may also be other irregular cubes. In addition, it should be noted that, in a liquid crystal phase shifting unit, the first support segment 20, the shape of the second support segment 21, and the shape of the third support segment 22 can have a same shape or different shapes, which is not specifically limited in the embodiments of the present disclosure.

Please refer to FIG. 3 again, the region between the first substrate 1 and the second substrate 2 further includes an encapsulation region 23. In order to encapsulate the liquid crystal molecules 5 and prevent the liquid crystal molecules 5 from overflowing to the outside of the liquid crystal phase shifting unit, the liquid crystal phase shifting unit further includes an encapsulation structure 24. The encapsulation structure 24 is disposed between the first substrate 1 and the second substrate 2, and the encapsulation structure 24 is located in the encapsulation region 23.

Figure 12:
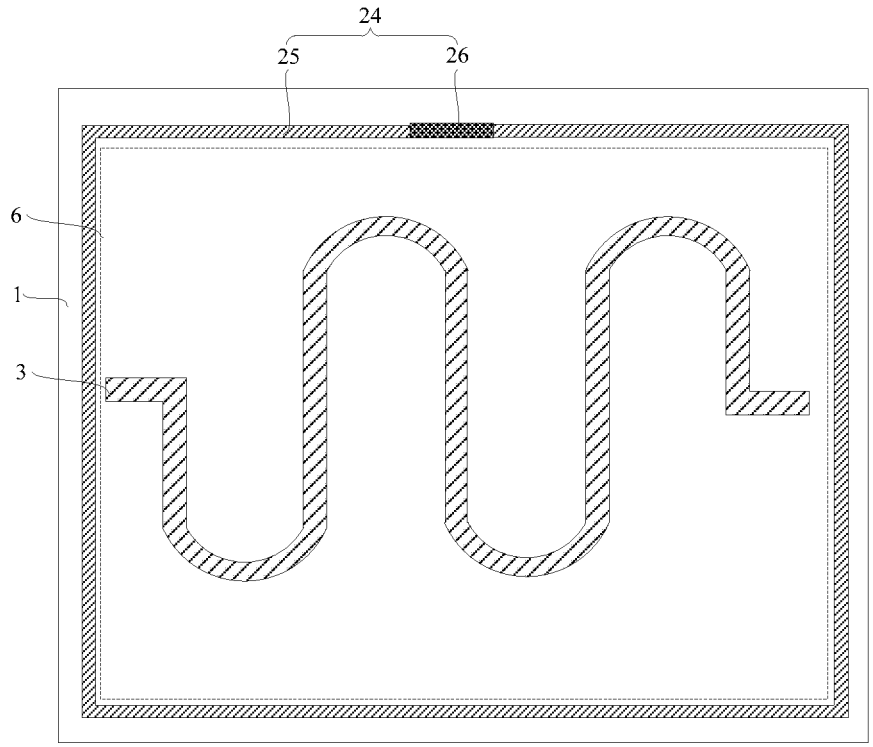
FIG. 12 is a schematic diagram of an encapsulation structure provided by an embodiment of the present disclosure.

In one embodiment, as shown in FIG. 12, which is a schematic diagram of the encapsulation structure provided by an embodiment of the present disclosure, the encapsulation structure 24 includes an encapsulation layer 25 and a cured layer 26. The encapsulation layer 25 surrounds the liquid crystal filling region 6. The encapsulation layer 25 is provided with at least one opening for filling the liquid crystal molecules 5 therethrough, and the at least one opening is sealed by the cured layer 26.

In the manufacturing process of the encapsulation structure 24, the encapsulation layer 25 having the opening is firstly formed, and then the liquid crystal molecules 5 are filled into the encapsulation layer 25, and after the filling, the opening is sealed with the cured layer 26 to avoid overflow of the liquid crystal molecules 5. The encapsulation layer 25 can be a sealant, and the cured layer 26 can be an ultraviolet cured adhesive.

There is one or more openings provided on the encapsulation layer 25. When the encapsulation layer 25 is provided with multiple openings, the liquid crystal molecules 5 can be filled into the encapsulation layer 25 via multiple openings, improving the filling efficiency of the liquid crystal molecules 5 in some degree.

Figure 13:
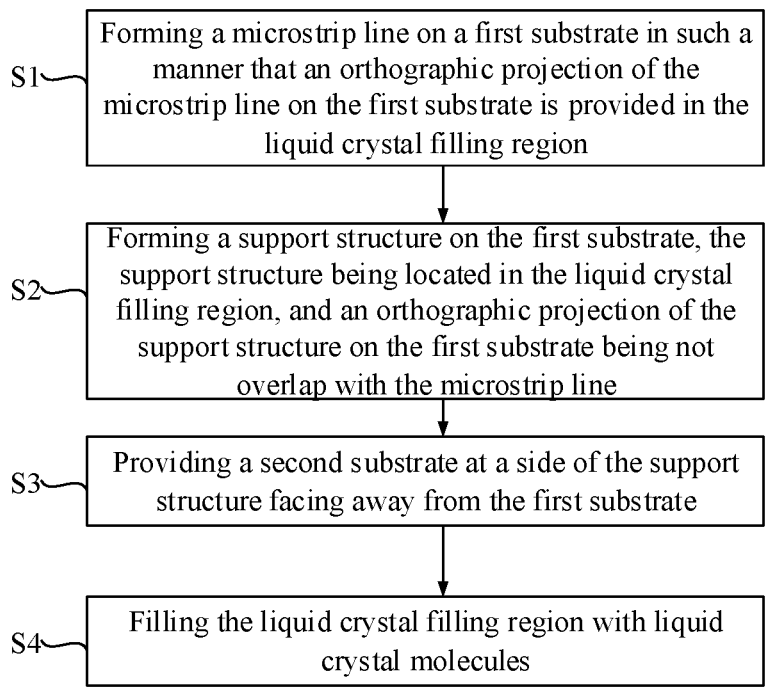
FIG. 13 is a flowchart of a manufacturing method for a liquid crystal phase shifting unit provided by an embodiment of the present disclosure.

An embodiment of the present disclosure further provides a manufacturing method for a liquid crystal phase shifting unit. The manufacturing method is applied to the above liquid crystal phase shifting unit. With reference to FIG. 3, as shown in FIG. 13, which is a flowchart of the method for manufacturing a liquid crystal phase shifting unit provided by an embodiment of the present disclosure, the method for manufacturing the liquid crystal phase shifting unit includes the following steps.

At step S1, the microstrip line 3 is formed on the first substrate 1 in such a manner that the orthographic projection of the microstrip line 3 on the first substrate is located in the liquid crystal filling region 6.

At step S2, the support structure 4 is formed on the first substrate 1, the support structure 4 is located in the liquid crystal filling region 6, and the orthographic projection of the support structure 4 on the first substrate 1 does not overlap the microstrip line 3.

At step S3, the second substrate 2 is provided at a side of the support structure 4 facing away from the first substrate 1.

At step S4, the liquid crystal filling region 6 is filled with liquid crystal molecules.

With the liquid crystal phase shifting unit formed by the manufacturing method provided by embodiments of the present disclosure, there is no need to provide a liquid crystal groove on the substrate, thus avoiding the uneven thickness of the liquid crystal groove caused by process. Furthermore, the support structure 4 is provided in an area, other than the microstrip line 3, in the liquid crystal filling region 6, which can not only steadily support the liquid crystal filling region 6 and improve the uniformity of the cell gap, but also avoid the affecting of the support structure 4 on the transmission of the microwave signal, thus improving the transmission stability of the microwave signal.

In one embodiment, in conjunction with FIG. 5, when the support structure 4 includes a sealant 10 and spacers 11 distributed in the sealant 10, forming the support structure 4 on the first substrate 1 includes: mixing the spacers 11 into the sealant 10 and coating the first substrate 1 with the sealant 10 mixed with the spacers 11. Compared with the manner of spraying to form the spacers 11, using this manufacturing method, the positions of the spacers 11 are fixed by means of the sealant 10, and the spacers 11 are prevented from getting into contact with the microstrip line 3, avoiding the interference or diffraction of the microwave signal caused by the spacers 11, improving the transmission stability of the microwave signal, and further improving the accuracy of the phase shifting.

In one embodiment, in conjunction with FIG. 12, when the liquid crystal phase shifting unit includes the encapsulation structure 24 and the encapsulation structure 24 includes the encapsulation layer 25 and the cured layer 26, before the liquid crystal filling region 6 is filled with the liquid crystal molecules 5, the manufacturing method for the liquid crystal phase shifting unit further includes: disposing the encapsulation layer 25 within the encapsulation region 23 in such a manner that the encapsulation layer 25 include at least one opening. And, filling the liquid crystal filling region 6 with liquid crystal molecules 5 includes filling the liquid crystal molecules 5 into the liquid crystal filling region 6 via the opening. After filling the liquid crystal filling region 6 with liquid crystal molecules 5, the manufacturing method for the liquid crystal phase shifting unit further includes: sealing the opening by the cured layer 26.

There is one or more openings provided on the encapsulation layer 25. When the encapsulation layer 25 is provided with multiple openings, the encapsulation layer 25 can be filled with the liquid crystal molecules 5 via multiple openings, improving the filling efficiency of the liquid crystal molecules 5 in some degree.

Figure 14:
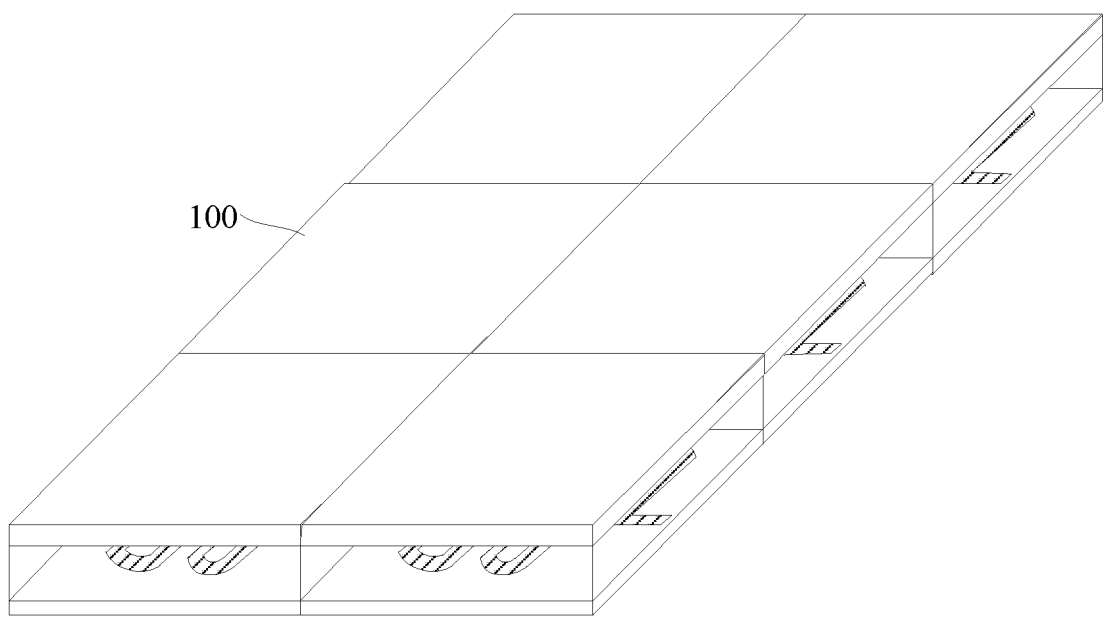
FIG. 14 is a schematic diagram of a liquid crystal phase shifter provided by an embodiment of the present disclosure.

An embodiment of the present disclosure further provides a liquid crystal phase shifter. As shown in FIG. 14, which is a schematic diagram of a liquid crystal phase shifter provided by an embodiment of the present disclosure, the liquid crystal phase shifter includes multiple above-described liquid crystal phase shifting units 100 which are arranged in a matrix. Since the liquid crystal phase shifter provided by the embodiment of the present disclosure includes the liquid crystal phase shifting units 100, with the liquid crystal phase shifter, the liquid crystal filling region can be steadily supported, which improves the uniformity of the cell gap, and moreover, the affecting of the support structure on the microwave signal can be avoided, which improves the transmission stability of the microwave signal.

An embodiment of the present disclosure further provides an antenna, and the antenna includes the above liquid crystal phase shifter. Therefore, the antenna can improve the uniformity of the cell gap and improve the transmission stability of the microwave signal.

What is claimed is:

1. A liquid crystal phase shifting unit, comprising:
a first substrate and a second substrate that are opposite to each other, wherein a space between the first substrate and the second substrate comprises a liquid crystal filling region;
a microstrip line provided on a surface of the first substrate facing towards the second substrate, wherein an orthographic projection of the microstrip line on the first substrate is located in the liquid crystal filling region;
support structures provided between the first substrate and the second substrate and located in the liquid crystal filling region, wherein an orthographic projection of each of the support structures on the first substrate does not overlap the microstrip line; and
liquid crystal molecules, the liquid crystal filling region being filled with the liquid crystal molecules,
wherein the orthographic projections of two adjacent support structures of the support structures on the first substrate do not overlap the microstrip line.

2. The liquid crystal phase shifting unit according to claim 1, wherein each of the support structures comprises a sealant and spacers distributed in the sealant.

3. The liquid crystal phase shifting unit according to claim 1, wherein the microstrip line is a serpentine wire.

4. The liquid crystal phase shifting unit according to claim 3, wherein the microstrip line comprises a plurality of U-shaped structures, and openings of every two adjacent U-shaped structures have opposite orientation;
wherein each of the plurality of U-shaped structures comprises a first transmission wire segment, a second transmission wire segment and a third transmission wire segment that are connected in sequence, wherein the third transmission wire segment of one of the every two adjacent U-shaped structures is reused as the first transmission wire segment of the other one of the every two adjacent U-shaped structures; and
wherein the support structures comprise a plurality of first support bars located in the openings of the plurality of U-shaped structures and extending in a column direction.

5. The liquid crystal phase shifting unit according to claim 4, wherein at least one of the plurality of first support bars extends out of corresponding opening of the plurality of U-shaped structures.

6. The liquid crystal phase shifting unit according to claim 4, wherein the support structures further comprise a plurality of second support bars, wherein each of the plurality of second support bars is located at a side of one second transmission wire segment facing away from the plurality of U-shaped structures; and wherein the plurality of second support bars extends in a row direction, and a minimum distance between the plurality of second support bars and a plurality of second transmission wire segments is h, wherein 3 mm≤h≤8 mm.

7. The liquid crystal phase shifting unit according to claim 6, wherein there is a gap between the plurality of first support bars and the plurality of second support bars.

8. The liquid crystal phase shifting unit according to claim 6, wherein the support structures further comprise a plurality of third support bars located at a side of the plurality of second support bars facing away from the microstrip line and extending in the column direction.

9. The liquid crystal phase shifting unit according to claim 8, wherein there is a gap between the plurality of second support bars and the plurality of third support bars.

10. The liquid crystal phase shifting unit according to claim 8, wherein each of the plurality of first support bars comprises a plurality of discontinuous first support segments; and/or,
each of the plurality of second support bars comprises a plurality of discontinuous second support segments; and/or,
each of the plurality of third support bars comprises a plurality of discontinuous third support segments.

11. The liquid crystal phase shifting unit according to claim 1, further comprising:
an encapsulation structure provided between the first substrate and the second substrate, wherein the space between the first substrate and the second substrate further comprises an encapsulation region surrounding the liquid crystal filling region, and the encapsulation structure is located in the encapsulation region.

12. The liquid crystal phase shifting unit according to claim 11, wherein the encapsulation structure comprises an encapsulation layer and a cured layer, wherein the encapsulation layer surrounds the liquid crystal filling region and is provided with at least one opening for filling the liquid crystal molecules therethrough, and the at least one opening is sealed by the cured layer.

13. A manufacturing method for a liquid crystal phase shift unit, applied to a liquid crystal phase shift, wherein the liquid crystal phase shifting unit comprises:
a first substrate and a second substrate that are opposite to each other, wherein a space between the first substrate and the second substrate comprises a liquid crystal filling region;
a microstrip line provided on a surface of the first substrate facing towards the second substrate, wherein an orthographic projection of the microstrip line on the first substrate is located in the liquid crystal filling region;
support structures provided between the first substrate and the second substrate and located in the liquid crystal filling region, wherein an orthographic projection of each of the support structures on the first substrate does not overlap the microstrip line; and
liquid crystal molecules, the liquid crystal filling region being filled with the liquid crystal molecules, wherein the orthographic projections of two adjacent support structures of the support structures on the first substrate do not overlap the microstrip line; and
wherein the manufacturing method comprises:
forming the microstrip line on the first substrate in such a manner that the orthographic projection of the microstrip line on the first substrate is located in the liquid crystal filling region;
forming the support structures on the first substrate, wherein the support structures are located in the liquid crystal filling region, and the orthographic projection of each of the support structures on the first substrate does not overlap the microstrip line;
providing the second substrate at a side of the support structures facing away from the first substrate; and
filling the liquid crystal filling region with the liquid crystal molecules.

14. The manufacturing method for the liquid crystal phase shift unit according to claim 13, wherein each of the support structures comprises a sealant and spacers distributed in the sealant; and
wherein said forming the support structures on the first substrate comprises:
mixing the spacers into the sealant and coating the first substrate with the sealant mixed with the spacers.

15. The manufacturing method for the liquid crystal phase shift unit according to claim 13, wherein the liquid crystal phase shift unit further comprises an encapsulation structure provided between the first substrate and the second substrate, and the encapsulation structure is located in an encapsulation region surrounding the liquid crystal filling region and comprises an encapsulation layer and a cured layer;
wherein the manufacturing method further comprises, prior to said filling the liquid crystal filling region with the liquid crystal molecules: disposing the encapsulation layer within the encapsulation region in such a manner that the encapsulation layer comprises at least one opening;
wherein said filling the liquid crystal filling region with the liquid crystal molecules comprises filling the liquid crystal filling region with the liquid crystal molecules via the at least one opening;
wherein the manufacturing method further comprises, after said filling the liquid crystal filling region with liquid crystal molecules: sealing the at least one opening with the cured layer.

16. A liquid crystal phase shifter, comprising a plurality of liquid crystal phase shifting units arranged in an array, wherein each of the plurality of liquid crystal phase shifting units comprises:
a first substrate and a second substrate that are opposite to each other, wherein a space between the first substrate and the second substrate comprises a liquid crystal filling region;
a microstrip line provided on a surface of the first substrate facing towards the second substrate, wherein an orthographic projection of the microstrip line on the first substrate is located in the liquid crystal filling region;
support structures provided between the first substrate and the second substrate and located in the liquid crystal filling region, wherein an orthographic projection of each of the support structures on the first substrate does not overlap the microstrip line; and
liquid crystal molecules, the liquid crystal filling region being filled with the liquid crystal molecules,
wherein the orthographic projections of two adjacent support structures of the support structures on the first substrate do not overlap the microstrip line.

17. An antenna, comprising the liquid crystal phase shifter according to claim 16.

* * * * *